United States Patent Office 3,211,762
Patented Oct. 12, 1965

3,211,762
PROCESS FOR THE MANUFACTURE OF $\Delta^{4:6}$-3-OXO-19-HYDROXY-STEROIDS
Albert Wettstein, Riehen, and Georg Anner, Karl Heusler, Jaroslav Kalvoda, and Peter Wieland, Basel, Switzerland, assignors to Ciba Corporation, New York, N.Y., a corporation of Delaware
No Drawing. Filed Nov. 6, 1962, Ser. No. 235,850
Claims priority, application Switzerland, Nov. 10, 1961, 13,092/61; Dec. 29, 1961, 15,170/61
7 Claims. (Cl. 260—397.4)

The present invention provides a process for the manufacture of 19-oxygenated $\Delta^{4:6}$-3-oxosteroids of the androstane and pregnane series. These compounds are important intermediates for the manufacture of corresponding $\Delta^{4:6}$-3-oxo-19-nor compounds among which, for example, the known $\Delta^{4:6}$-3-oxo-17$\alpha$-ethinyl-17$\beta$-hydroxy-19-nor-androstadiene and its derivatives methylated in position 6 and/or at the ethinyl group, are especially valuable because of their strong progrestative action. Likewise, 6-dehydro-19-norprogesterone and more especially 6-dehydro-17$\alpha$-acetoxy-19-norprogesterone are much more active than the progesterones occurring in nature.

Two processes are known for the manufacture of $\Delta^{4:6}$-3-oxosteroids from the corresponding $\Delta^4$-3-oxosteroids, namely bromination in position 6 with N-bromosuccinimide followed by dehydrobromination with the aid of a base such as collidine or the like, and the industrially more interesting introduction of the new double bond in one stage. The latter reaction can be carried out in the case of 19-unsubstituted steroids by treatment with manganese dioxide or with a quinone in an inert solvent. Although these processes can also be applied to 19-norsteroids, the yields obtained are so low that said processes have not been adopted industrially. On treatment of 17$\alpha$-methyl-19-nortestosterone with chloranil in boiling tertiary butanol, for example, there are obtained only traces of the corresponding 6-dehydro compound. Since the conversion of the readily accessible $\Delta^{4:6}$-3-oxosteroids into the corresponding 19-nor compounds has not been achieved to date, an industrially more advantageous process for the manufacture of said steroids is of considerable importance.

The present invention is based on the observation that $\Delta^{4:6}$-3-oxo-19-norsteroids can be manufactured in good yields by converting 19-oxygenated $\Delta^4$-3-oxo-steroids into 19-oxygenated $\Delta^{4:6}$-3-oxosteroids and splitting off the angular C—19 group, if desired after having oxidized a 19-hydroxyl group.

The present invention provides more especially a process for the manufacture of 19-oxygenated $\Delta^{4:6}$-3-oxosteroids from 19-oxygenated $\Delta^4$-3-oxosteroids, wherein in known manner a double bond is introduced in position 6:7 in a 19-oxygenated $\Delta^4$-3-oxosteroid by treatment with a dehydrogenating agent.

Suitable dehydrogenating agents are, for example, manganese dioxide, and more especially quinones, for example benzoquinone, chloranil, dicyano-dichloro-benzoquinones, 2:6-dichloro-benzoquinone, 1:4-naphthoquinone, paratoluquinone and the like. The reaction is carried out in an inert solvent at an elevated temperature, preferably ranging from 70 to 180° C. Suitable solvents are, for example, aromatic hydrocarbons such as toluene, xylene, chlorobenzene, para-dichlorobenzene, alcohols such as tertiary butanol, secondary amyl alcohol, tertiary amyl alcohol, or esters such as methyl butyrate, butyl acetate, propyl propionate and the like, or also lower aliphatic carboxylic acids such as acetic, propionic, butyric acid or the like.

Starting materials suitable for use in the present process are 19-oxygenated $\Delta^4$-3-oxosteroids of the androstane, pregnane, cholane, cholestane, spirostane and cardanolide series whose ring system contains more especially in one or several of the positions 1, 2, 6, 8, 3, 11, 12, 14, 15, 16, 17, 20, 21 further substituents, such as free or functionally converted oxo groups, or esterified or etherified hydroxyl groups, or alkyl (for example methyl) groups and/or halogen atoms. The term "converted oxo groups" refers both to ketalized oxo groups and to oxo groups converted into enol derivatives, for example enolethers or enolesters. Furthermore, the starting materials may contain additional double bonds, for example in position 16:17 or in the side chain.

The 19-oxygenated $\Delta^4$-3-oxo compounds to be used as starting materials are, above all, compounds containing a free, esterified or etherified 19-hydroxyl group, or a free or protected 19-oxo group or an esterified steroid-19-acid. $\Delta^4$-3-oxo-19-hydroxysteroids are readily accessible from 19-unsubstituted steroids by microbiological hydroxylation or according to the process of U.S. patent application Ser. No. 122,656, filed July 10, 1961 now U.S. Patent 3,077,482, by Albert Wettstein et al. These compounds can be esterified or etherified in position 19 in known manner. Alternatively, the 19-hydroxy compounds can be oxidized to 19-oxo compounds and 19-acids as described in said application.

Particularly valuable starting materials are those 19-oxygenated $\Delta^4$-3-oxosteroids which contain in position 6 a methyl group or preferably a halogen atom, for example a chlorine or fluorine atom. The halogenated derivatives can be prepared from a 4-unsubstituted $\Delta^4$-3-ketone by first converting it into an enol derivative (for example into an enolester or an enolacetate, accompanied by acylation of a 19-hydroxyl group present), for example by treatment with isopropenyl acetate in the presence of an acidic catalyst, for example sulfuric or toluene sulfonic acid, or it may be converted into an enolether by treatment with an ortho-ester, for example orthoformic acid methyl or ethyl ester, with addition of an acidic catalyst. These enol derivatives are then halogenated in known manner with a halogenating agent such as N-chlorosuccinimide, N-chloroacetamide, or perchloryl fluoride, to yield the $\Delta^4$-3-oxo-6-halogeno compounds.

As specific starting materials there may be mentioned, for example:

$\Delta^4$-3:17-dioxo-19-hydroxyandrostene,
$\Delta^4$-3-oxo-17$\beta$:19-dihydroxyandrostene,
$\Delta^4$-3-oxo-17$\alpha$-methyl-17$\beta$:19-dihydroxyandrostene,
$\Delta^4$-3-oxo-17$\alpha$-ethyl-17$\beta$:19-dihydroxyandrostene,
$\Delta^4$-3-oxo-17$\alpha$-allyl-17$\beta$:19-dihydroxyandrostene,
$\Delta^4$-3-oxo-17$\alpha$-vinyl-17$\beta$:19-dihydroxyandrostene,
$\Delta^4$-3-oxo-17$\alpha$-ethinyl-17$\beta$:19-dihydroxyandrostene,
$\Delta^4$-3-oxo-17$\alpha$-(2'-methyl-ethinyl)-17$\beta$:19-dihydroxy-androstene and their esters, more especially the monoesters and diesters, for example the formates, acetates, trifluoroacetates, propionates and benzoates.

Furthermore, there may be mentioned:

$\Delta^4$-3:20-dioxo-19-hydroxypregnene,
$\Delta^4$-3:20-dioxo-17$\alpha$:19-dihydroxypregnene,
$\Delta^4$-3:20-dioxo-17$\alpha$-acetoxy-19-hydroxypregnene,
$\Delta^4$-3:20-dioxo-17$\alpha$-caproyloxy-19-hydroxypregnene,
$\Delta^4$-3:20-dioxo-6$\alpha$-chloro-19-hydroxy-17$\alpha$-acetoxy and 17$\alpha$-caproyloxypregnene, and the corresponding 19-esters, for example formates, acetates, propionates, trifluoroacetates and benzoates.

Another object of the invention are 19-oxygenated $\Delta^{4:6}$-3-oxo-6-halogeno-19-hydroxypregnadienes, more especially:

$\Delta^{4:6}$-3:20-dioxo-6-chloro-, -6-bromo- and -6-fluoro-19-hydroxypregnadiene, $\Delta^{4:6}$-3:20-dioxo-6-chloro-, -6-bromo- and 6-fluoro-17$\alpha$:19-dihydroxypregnadiene and their esters, such as acetates, propionates, caproates and undecylenates.

Taking into consideration the ease with which the 19-carbon atom of 19-oxygenated $\Delta^4$-3-ketones is split off with formation of 19-norsteroids, it is surprising that the dehydrogenation of the invention gives such a good yield comparable with the yield obtained with 19-unsubstituted $\Delta^4$-3-ketones. It is especially unexpected that even compounds containing a free 19-hydroxyl group can be used.

The conversion of the $\Delta^{4:6}$-3-oxo-19-hydroxysteroids into $\Delta^{4:6}$-3-oxo-19-norsteroids by the present process has been described in detail in U.S. patent application Ser. No. 208,634, filed July 9, 1962 by Albert Wettstein et al. according to that process $\Delta^{4:6}$-3-oxo-19-hydroxysteroid-dienes are oxidized to steroid-19-acids which are then decarboxylated.

The following examples illustrate the process of the invention.

*Example 1*

A solution of 8.0 grams of $\Delta^4$-3:17-dioxo-19-hydroxy-androstene in 500 cc. of tertiary butanol is mixed with 28.0 grams of chloranil and the whole is refluxed for 3 hours. The reaction mixture is cooled, the excess chloranil is filtered off, and the filtrate is evaporated under vacuum. The residue is dissolved in a 4:1-mixture of ether and methylene chloride, and the solution is washed with ice-cold sodium hydroxide solution of 5% strength and then with water, dried and evaporated under vacuum. One recrystallization from methylene chloride+petroleum ether yields 5.45 grams of slightly yellowish $\Delta^{4:6}$-3:17-dioxo-19-hydroxyandrostene melting at 198–200° C. Optical rotation $[\alpha]_D=+135.6°$ (c.=0.813). Ultraviolet spectrum: $\lambda_{max}=283$ m$\mu$ ($\epsilon=25\ 400$).

The infra-red spectrum of the compound contains absorption bands, inter alia, at 2.75, 5.75, 6.01, 6.16, 6.29, 7.36, 8.20, 8.27, 9.48 and 11.38$\mu$.

*Example 2*

A mixture of 100 mg. of $\Delta^4$-3:20-dioxo-17$\alpha$-acetoxy-19-hydroxypregnene, 350 mg. of chloranil and 10 cc. of tertiary butanol is refluxed for 1½ hours. The reaction mixture is cooled, freed from excess chloranil by filtration, and the yellow solution is evaporated under vacuum. The residue is taken up in a 4:1-mixture of ether and methylene chloride and the extract is successively washed with ice-cold N-sodium hydroxide solution and water, dried and evaporated. By triturating the crude product with ether there are obtained 71 mg. of $\Delta^{4:6}$-3:20-dioxo-17$\alpha$-acetoxy-19-hydroxypregnadiene which is purified by recrystallization from methylene chloride+ether+petroleum ether; it melts at 200–201° C. Ultra-violet absorption $\lambda_{max}$ 284 m$\mu$ ($\epsilon=22\ 400$). Infra-red absorption bands, inter alia, at 2.82, 5.77, 5.80, 6.02, 6.19, 6.32, 9.00 and 11.35$\mu$.

*Example 3*

A suspension of 1.50 grams of $\Delta^4$-3:20-dioxo-6$\alpha$-chloro-17$\alpha$-acetoxy-19-hydroxypregnene and 4.0 grams of 2:3-dichloro-5:6-dicyanobenzoquinone in 100 cc. of tertiary butanol is stirred under reflux for 2 hours, then allowed to cool, and the dark-colored solution is filtered off from the excess quinone. The filtrate is evaporated under vacuum and the residue is extracted with ether+methylene chloride (4:1), and the extract is exhaustively washed with N-sodium hydroxide solution and water, dried, and evaporated under vacuum. The reddish brown crude product is dissolved in 100 cc. of benzene and chromatographed on 30 times its own weight of neutral alumina (activity II). Mixtures of benzene and ethyl acetate elute 1.01 grams of pure $\Delta^{4:6}$-3:20-dioxo-6-chloro-17$\alpha$-acetoxy-19-hydroxypregnadiene. Its infra-red spectrum contains absorption bands, inter alia, at 2.82, 5.76, 5.82, 6.03, 6.22, 6.31, 8.10 and 11.30$\mu$. Ultra-violet maximum at 283 m$\mu$ ($\epsilon=23\ 500$).

The $\Delta^4$-3:20-dioxo-6$\alpha$-chloro-17$\alpha$-acetoxy-19-hydroxypregnene used as starting material can be prepared by the known methods referred to above from $\Delta^4$-3:20-dioxo-17$\alpha$-acetoxy-19-hydroxypregnene melting at 233° C. The alter product—after acetylating the 19-hydroxyl group to form the 17$\alpha$:19-diacetate (melting at 208–209° C.)—is converted in a solution in dioxane with orthoformic acid ethyl ester and sulfuric acid as catalyst into the corresponding enolether which does not crystallize (infra-red absorption bands, inter alia, at 5.78, 6.05, 6.15, 8.15, 8.41, 8.53, 10.37 and 11.62$\mu$) and, on treatment with N-chlorosuccinimide in acetone, furnishes crude $\Delta^4$-3:20-dioxo-6$\alpha$-chloro-17$\alpha$:19-diacetoxypregnene in which the 19-acetoxy group can be selectively hydrolyzed with sodium bicarbonate.

What is claimed is:

1. $\Delta^{4:6}$-3:20-dioxo-6-halogen-19-hydroxy-pregnadiene.
2. $\Delta^{4:6}$-3:20-dioxo-6-chloro-19-hydroxy-pregnadiene.
3. $\Delta^{4:6}$ - 3:20 - dioxo - 6 - halogen - 17:19 - dihydroxypregnadiene.
4. A member selected from the group consisting of a 17,19-diester of the compound claimed in claim 3 derived from a carboxylic acid having at most 15 carbon atoms.
5. $\Delta^{4:6}$ - 3:20 - dioxo - 6 - chloro - 17$\alpha$:19 - dihydroxypregnadiene.
6. A member selected from the group consisting of a 17,19-diester of the compound claimed in claim 5 derived from a carboxylic acid having at most 15 carbon atoms.
7. $\Delta^{4:6}$ - 3:20 - dioxo - 6 - chloro - 17$\alpha$ - acetoxy - 19 - hydroxypregnadiene.

References Cited by the Examiner

UNITED STATES PATENTS

| | | | |
|---|---|---|---|
| 3,040,038 | 6/62 | Shull | 260—239.55 |
| 3,076,823 | 2/63 | Ringold et al. | 260—397.4 |
| 3,087,940 | 4/63 | Rubin | 260—397.4 |

OTHER REFERENCES

Westerhof, et al.: Rec. Trav. Chim., vol. 79, (1960), pp. 794–799.

LEWIS GOTTS, *Primary Examiner.*